United States Patent [19]
Eastman et al.

[11] Patent Number: 5,880,832
[45] Date of Patent: Mar. 9, 1999

[54] SPECTROPHOTOMETRY

[75] Inventors: Jay M. Eastman; James M. Zavislan, both of Pittsford, N.Y.

[73] Assignee: Lucid Inc., Henrietta, N.Y.

[21] Appl. No.: 808,223

[22] Filed: Feb. 28, 1997

Related U.S. Application Data

[63] Continuation of Ser. No. 471,617, May 22, 1995, Pat. No. 5,684,562, which is a continuation of Ser. No. 210,806, Mar. 18, 1994, abandoned.

[51] Int. Cl.$^6$ ...................................................... G01J 3/28
[52] U.S. Cl. .......................................................... 356/326
[58] Field of Search .................................... 356/326, 328, 356/330–334, 319, 425

[56] References Cited

U.S. PATENT DOCUMENTS

| | | | |
|---|---|---|---|
| 4,320,971 | 3/1982 | Hashimoto et al. | 356/334 |
| 4,449,821 | 5/1984 | Lee | 356/319 |
| 4,969,739 | 11/1990 | McGee | 356/334 |
| 5,116,123 | 5/1992 | Kuderer | 356/328 |
| 5,517,302 | 5/1996 | Stearns et al. | 356/326 |
| 5,524,152 | 6/1996 | Bishop et al. | 356/425 |

*Primary Examiner*—K P Hantis
*Attorney, Agent, or Firm*—M. LuKacher; K. J. LuKacher

[57] ABSTRACT

A robust spectrophotometer (also known as a color spectrometer or colorimeter) is self contained in a housing which is adapted to be held-held and has all of the electrical, optical and electro optic elements mounted on a board captured within the housing at one end of which light from a sample is restricted to an object area and projected after being dispersed spectrally, as with a reflection grating, to an image area at a photodetector via a lens which has an optical axis and converges the dispersed light at the image area. The dispersive element is mounted on an arm having a pivot laterally offset from the dispersive element's surface where a diverging beam of light from the object area is incident and is deflected to the image area. The geometry is such that the dispersive element may be rotated to a position where the beam is specularly deflected (zeroth order diffraction), and the spectrometer calibrated when the dispersive element is in the specular reflection/deflection position. The path from the object area is approximately perpendicular to the optical axis, and then is folded by mirrors to direct the beam to incidence on the dispersive element, from which the beam is deflected and focused by the lens, the focal length of which is such that the image and object areas are in conjugate relationship. A pivotal foot on the housing having an aperture may be used to facilitate alignment of the sample with the entrance opening to the housing of the spectrophotometer.

3 Claims, 9 Drawing Sheets

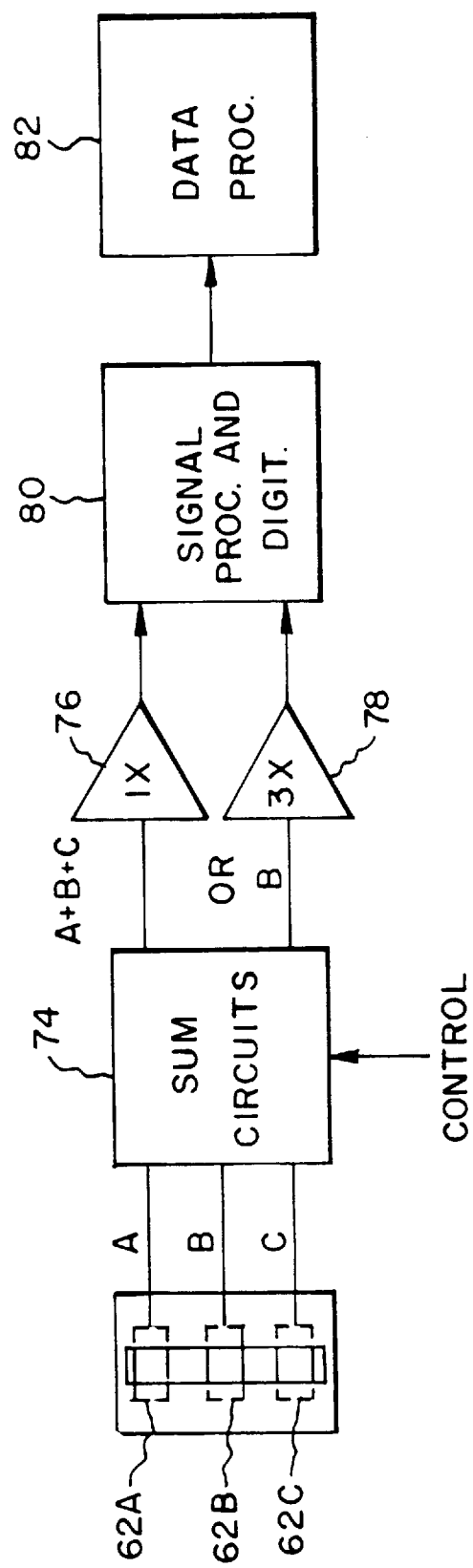

SPECTROPHOTOMETRY

This is a continuation of application Ser. No. 08/471,617 filed May 22, 1995, now U.S. Pat. No. 5,684,562, issued Nov. 4, 1995, which is a continuation of application Ser. No. 08/210,806, filed Mar. 18, 1994, now abandoned.

DESCRIPTION

The present invention relates to spectrophotometry and more particularly to apparatus for measuring the spectrum of optical illumination at a plurality of successive wavelength increments.

The invention is especially suitable in use for color management to enable colors to be matched for consistency with accepted color standards and for balance so that images formed by color reprographics (especially by digital or computer controlled imaging techniques) can meet applicable standards. Spectrophotometry apparatus and methods which are practiced in accordance with the invention may also be useful in the calibration of radiant sources such as the screens of color monitors (phosphors of which are electronically activated to produce color images in such monitors.) The spectrometer apparatus may also be used as a densitometer and generally as a color spectrometer for color matching purposes as for example in mixing of paints. Such color matching and density control have been called color management in the reprographics field.

The wide and general use of spectrophotometers in color management has been limited by their cost, and the size and weight needed for arrangements of optical elements to provide the requisite accuracy of spectral measurements. Reducing the electrical and optical elements to a size which can be held-held and easily portable by an operator, without sacrificing accuracy of spectral measurements has been a goal, which now is achievable because of the invention. In addition to cost and size, another problem is that such held-held spectrophotometry instruments are likely to be dropped onto hard surfaces, and thus need to be robust, again without sacrificing accuracy.

Accordingly, it is the principal object of the present invention to make improvements in spectrophotometry, which enable spectral measurements of optical sources, whether radiant (optically emissive) or reflective, and which provide information as to the spectral characteristics thereof, to be made with sufficient accuracy for color management purposes by means of an instrument which is adapted to be held-held and portable.

It is a further object of the present invention to provide improved spectrophotometry apparatus which is both self-contained and portable, and which provides accurate spectral measurements.

It is a still further object of the present invention to provide an instrument which may be fabricated at a cost lower than instruments for the purpose which are presently commercially available and, although self-contained and of a size adapted to be held-held, which provides measurements of sufficient accuracy to be generally useful in color reprographics, calibration of computer monitors and other luminescent sources, and generally for color management purposes.

It is a still further object of the present invention to provide improved spectrophotometry apparatus which is adapted to be used either in a dispersive or specular reflective mode so as to obtain measurements of the intensity of luminescent sources as well as the spectrum thereof, thereby enabling such sources, such as color monitors to be calibrated so as to provide images with color accuracy and balance.

Briefly described, the invention improves the art of spectrophotometry by providing an instrument useful for measuring the spectrum of light which the instrument receives through the use of a dispersive element rotatable in angular increments, particularly increments corresponding to angular displacements of the shaft of a drive motor which effects movement of the dispersive element about an axis of rotation laterally displaced from the element. Optics provides a geometry which illuminates the dispersive element with light from a sample which enters the spectrophotometer at an object area. These optics include an aperture which defines the object area and which is desirably in the form of a rectangular slit. The aperture forms the illumination into a beam which diverges as it propagates along a first path between the object area and the dispersive element, on a surface of which the beam is incident. The beam is then deflected (diffracted where the dispersive element is a grating, as is preferably the case). The deflected beam propagates along a second path to a photodetector at an image area which terminates the second path. A lens having an optical axis is disposed along the second path. The dispersion in the dispersive element spatially distributes the illumination in accordance with its wavelength so that the chief ray of the illumination, which has a wavelength in the middle of each optical increment, extends along the optical axis regardless of the angular orientation of the dispersive element as it scans the wavelength of the illumination. The rays of wavelength at each end of the wavelength increments are at opposite sides of the beam and are focused at opposite ends of the image area by the lens. Thus, the entire spectral increment is measured and translated into a corresponding electrical signal by the photodetector.

In order to control the dynamic range of the signal produced by the photodetector, it may be desirable to provide an optical attenuating element which moves with the dispersive element across the first path, intercepting and attenuating the beam as a function of the angular displacement corresponding to the wavelength increment which is being measured. Then signals at one end of the spectrum (the longer wavelength end) are reduced in amplitude, relative to the signals obtained from the short wavelength end, without the need for electronic means for controlling the dynamic range, thereby providing outputs from the photodetector which correspond to the color perception of light. The light entering the object area is diffuse and may be imaged at a Fourier transfer plane (focal plane) of a field lens at the object area. Then, a shutter which moves with the dispersive element may be used as the attenuating element.

The dispersive element is desirably a plane diffraction grating which is operative in the −1 diffraction order to deflect the light in each wavelength increment so that the rays at the center wavelengths (chief rays) are generally along the optical axis of the lens. The optics permits the grating to be rotated to a position where the zeroth order diffraction or specular reflection from the grating occurs and illuminates the photodetector. In this position, the spectrophotometer may be used to monitor the intensity of the illumination and to obtain the intensity characteristic of a luminescent source, for example, a computer monitor; the phosphors of which emit at different intensities depending upon the intensity of the electron beam which excites the phosphor in the monitor. By varying the intensity of the electron beam (the current of each beam) in steps, the intensity characteristic of the monitor, and particularly of each color of the phosphor, may be measured so that the monitor may be adjusted to provide accurate color balance across its entire image intensity range.

The foregoing and other objects, features and advantages of the invention will become more apparent from a reading of the following description in connection with the accompanying drawings in which:

FIG. 10 is a schematic diagram of an embodiment of the photodetector for selecting samples of smaller and larger size for spectral analysis.

Figure 1:
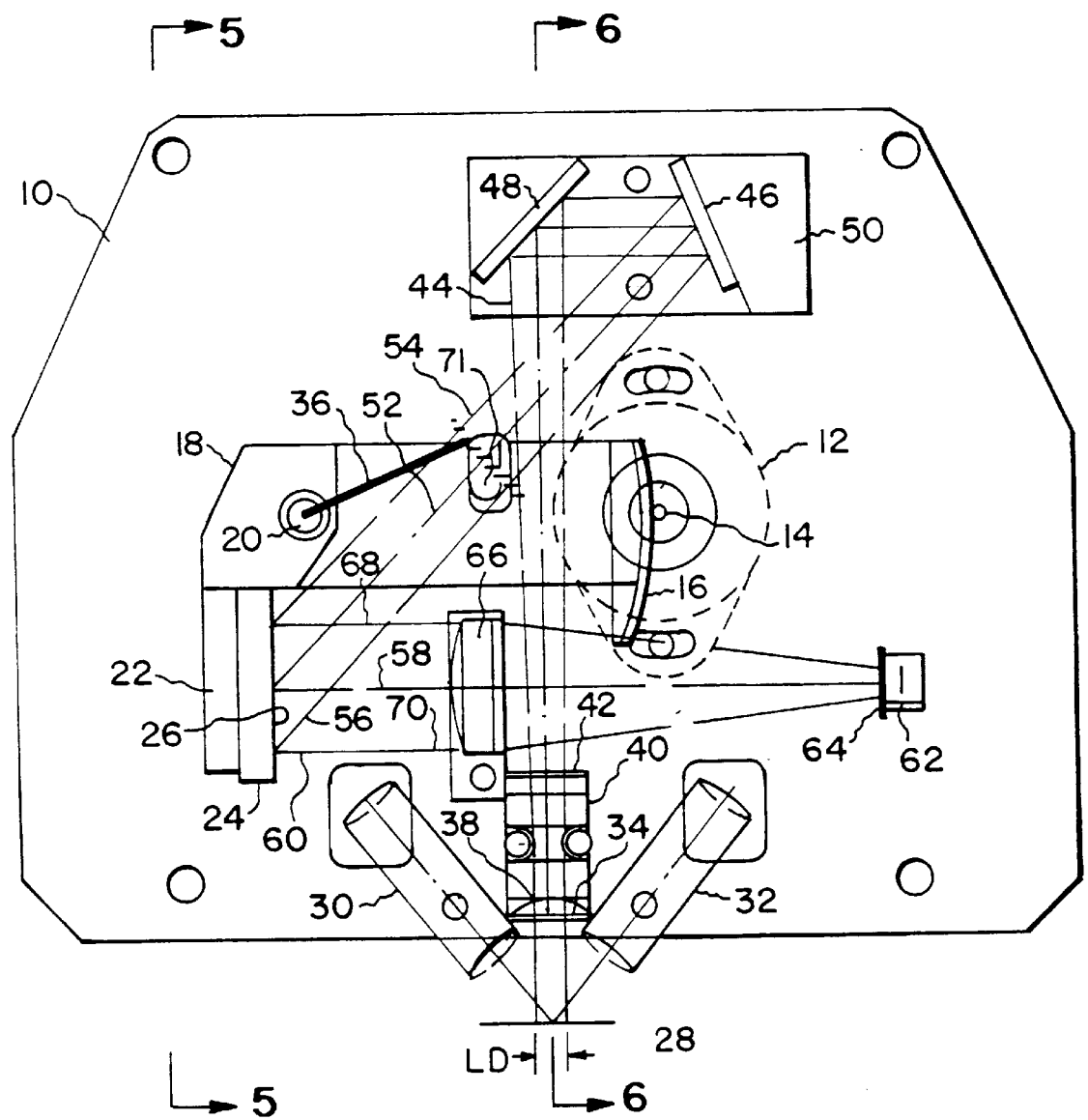
FIG. 1 is a plan view showing the arrangement of the optical and electro-optical components of spectrophotometer apparatus which is provided in accordance with the invention.
Figure 2:
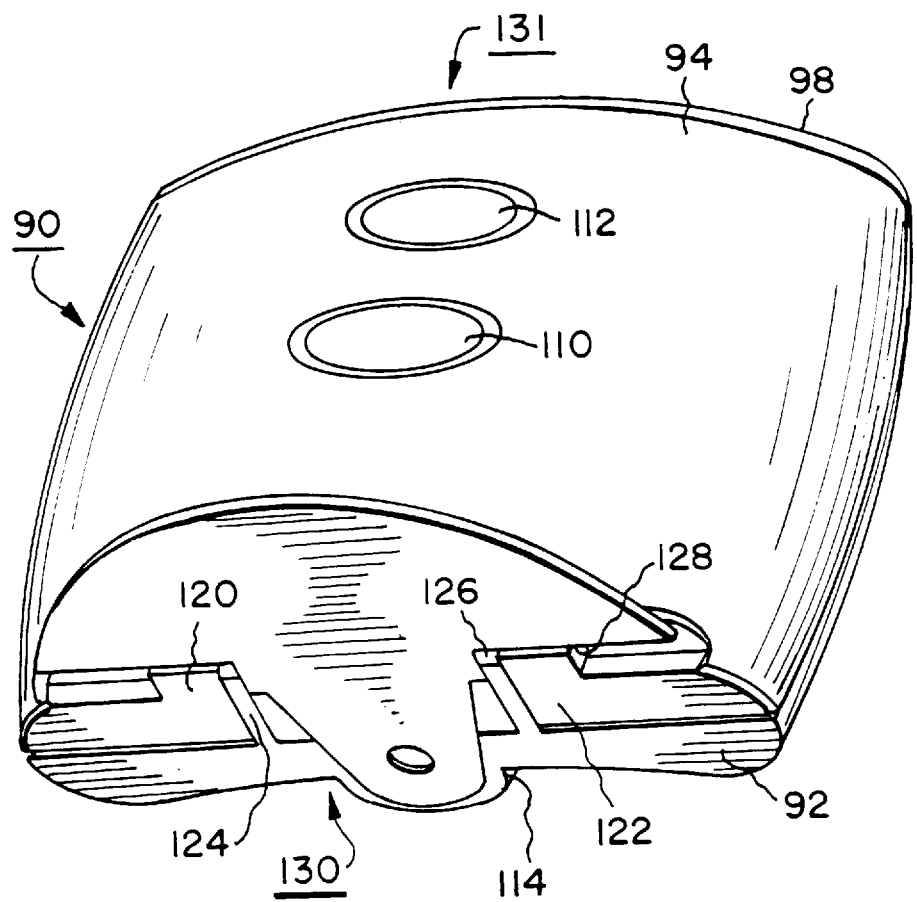
FIG. 2 is a perspective view illustrating a held-held and self-contained spectrophotometer which utilizes the spectrophotometry apparatus illustrated in FIG. 1.
Figure 3:
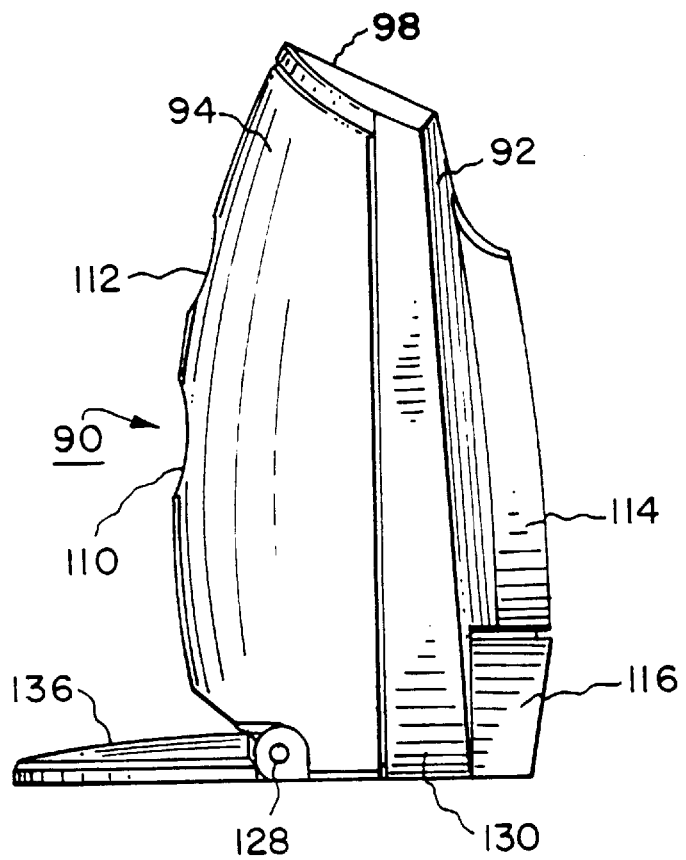
FIG. 3 is a side view of the spectrophotometer shown in FIG. 2.

Referring first to FIG. 1 there is shown a top view of optical, electronic and electrical components of a spectrophotometer embodying the invention which components are mounted on a plate provided by a circuit board 10 of insulating material having on the bottom side thereof, electronic components, principally integrated circuit chips, which are connected by printed wiring to the electrical and electronic components on the board 10 and to a connector which connects, via a cable, the spectrophotometer to equipment with which it is used, such as a computer. The cable is sufficiently long and flexible to enable the spectrophotometer to be hand-held and portable. The connector is not shown in the drawing to simplify the illustration. The components include a stepper motor 12 which is mounted on the bottom of the board and has a shaft 14 projecting through the board. The shaft is in frictional driving contact with an elastomeric, resilient layer 16 at an end of an arm 18 which is rotatable about an axis of a pivot 20 on the top of the board 10. The profile of the arm 18 at the end having the layer is circular, but may be made non-circular (cam shaped) to match the wavelength increments more closely to equal angular increments or steps, through which the shaft 14 turns when making a spectral response measurement.

Mounted on a bracket 22 at the end of the arm on the opposite side of the pivot where the resilient elastomeric layer 16 is attached, is a dispersive element, which is preferably a diffraction grating 24, which has grating lines on a face 26 thereof. These grating lines may be provided by blazing and are designed in accordance with conventional grating design techniques to deflect with maximum energy in the −1 diffraction order. Other dispersive elements such as prisms and other diffractive orders may be used.

It will be understood that the spectrophotometer may be used with the grating operative in the zeroth order where light incident on the face 26 is specularly deflected. While a reflection mode diffraction grating is preferred in this embodiment of the invention, another type of dispersive element may be used. The optics may also be usable in the transmission mode of the grating. However, the use of the transmission mode prevents the folding of the optical path and is not presently preferred, in the interest of providing a spectrophotometer of miniature size and weight. In this connection the herein illustrated spectrophotometer may be less than about 5 inches long and 5 inches wide and less than about two inches thick and have a weight of less than 1 pound thereby enabling it to be hand-held and portable.

The spectrophotometer is responsive to light from a sample which is spaced in the vicinity of an entrance end thereof at a location indicated at 28 in FIG. 1. This sample area may be a patch or test region on a photograph or other image to be reproduced. The spectrometer may also be used to measure the color content (spectral characteristics) of radiating optical sources, such as electro-luminescent devices. Such sources may be the screens of computer monitors, which are cathode ray tubes having phosphors which are excited by electron beams; the phosphors being on the screens of the cathode ray tube of the monitor.

In the event reflective patches or materials are to be analyzed for color or spectral content, they may be illuminated by lamps 30 and 32. Small lens end, incandescent lamp bulbs are preferably used as the lamps 30 and 32 to provide the illumination of a reflective sample.

An object area of the spectrophotometer is defined by a aperture or object slit 34, which is preferably a rectangular slit aperture with the short dimension of the slit LD defining the width of the object area. The long axis or length of the rectangle of the aperture is perpendicular to the plane of FIG. 1. The object area and the aperture are co-extensive. The light which reaches the aperture arrives from the entire sample area in a region defined by LD along the one dimension thereof. This light is diffuse and enters the object area (the aperture 34) from multiple directions.

The width of the object slit 34 and the image aperture (another rectangular slit) 64 which defines an image area determine the wavelength resolution. The width of the image slit is determined by the angular dispersive strength of the dispersive element and the focal length of the imaging lens. For a diffraction grating, the angular dispersive strength is obtained by differentiating the well known diffraction formula: $\sin\theta_1+(\lambda m)/p=\sin\theta_2$, where $\theta_1$ is the incident angle onto the grating, $\lambda$ the wavelength of illumination, m the order of diffraction, p the grating pitch, and $\theta_2$ the diffracting or diffraction angle. Differentiating this equation with respect to $\lambda$ and $\theta_2$, the angular dispersion of a grating is obtained: $\Delta\theta_2=\Delta\lambda m/(p\cos\theta_2)$. In the preferred embodiment, the diffracted angle is such that $\cos\theta_2 \geq 0.99$ over from $\lambda=390–700$ nm. Consequently the angular dispersion is approximately constant over the visible spectrum.

In the preferred embodiment where the grating is juxtaposed between the object and an imaging lens 66, the image slit 64 width is the angular dispersion of the grating multiplied by the distance from the second principal plane of the lens to the image of the object slit 34. For example, using a 30 mm focal length lens and a 1211 lp/mm (line per mm) grating with an object distance of 159.69 mm, the image distance is 36.94 mm, and the image slit width is 0.44 mm for 10 nm resolution image side resolution.

The total resolution of a spectrometer is the convolution of object-side and image-side wavelength resolutions. The optical throughput and resolution is optimized when the object-side and image-side wavelength resolutions are matched. This is achieved when the width of the image of the object slit equals the physical size of the image slit 64. This means that the angular width (perpendicular to the diffraction grooves) of the object slit, and image slit when viewed from the principal planes of the lens, are equal.

The magnification of the object slit to the image slit is anamorphic for prismatic and diffractive dispersive elements. Perpendicular to the direction of dispersion, the magnification is given by standard imaging: magnification= ratio of image to object distance. Parallel to the direction of dispersion, the magnification is given by the ratio of image to object distance multiplied by the angular magnification induced by the dispersive element. For a grating, the angular magnification is the ratio $\cos\theta_1/\cos\theta_2$. Therefore, an object slit 2.69 mm×9 mm is imaged to 0.44×2.08 mm using a 30 mm focal length lens and a 1200 lp/mm grating.

The height of the object slit is determined by four factors, the size of the emissive or illuminated sample area, the size of the optical elements (their apertures), the aberration tolerance of the system and the detector size. In the presently preferred embodiment, the aperture stop size is 12 mm and the object height is 9 mm.

In accordance with a feature of the invention the dynamic range of the spectral measurements may be controlled using a shutter 36 which is mounted on the arm 18. Then, it is desirable to provide a field lens 38 on the inside of the aperture 34 across the object area. This field lens may be a plano-convex lens having a focus at the location of the shutter 36. In other words, the shutter moves across the Fourier transfer plane of the lens 38. The lens 38 converts the angular distribution of light at the objects slit 34 into spatial distribution of intensity at the location where the shutter 36 interrupts the beam 44. Accordingly the shutter effects the spatial distribution of light from the sample area 28 uniformly. In the event that it is not desirable to use a field lens and shutter for attenuating the light to control the dynamic range of the spectrophotometer, a variable neutral density filter may be used as the attenuating element.

A bracket 40 supports the aperture 34 and another aperture 42 which serves as a baffle to restrict the size of a beam 44 of illumination, which diverges as the beam propagates away from the aperture 34 along a first path which terminates at the surface 26 of the grating 24. The length of this path is such that the grating is substantially filled on the face 26 thereof, at least along the LD dimension of the beam. In order to ensure such filling and also to coordinate the angular steps of rotation of the motor shaft 14 with the spectral increments being measured, the beam path length between the object slit 34 and the face 26 is effectively lengthened by means of optics including folding mirrors 46 and 48. These mirrors 46 and 48 are mounted on the top surface of the board 10 in a bracket 50 so that the beam path remains fixed, but sufficiently long to fill the face 26 of the grating. The chief (approximately central) ray 52 of the beam along the first path and the rays 54 and 56 spatially displaced at opposite ends of the dimension LD are indicated in FIG. 1.

The beam is deflected by the grating 24 in accordance with the wavelength of the illumination by different amounts in accordance with the period of the grating (the distance between the grating lines) and the wavelength of the illumination. The equation describing the dispersion of a grating is $\sin\theta_1+(\lambda m)/p=\sin\theta_2$, where $\theta_1$ is the angle of incidence. $\theta_2$ is the angle of diffraction, $\lambda$ is the wavelength of light, m is the order of diffraction, and p is grating period. The period and the angle of incidence of the beam on the surface 24, for example as measured by the angle between a perpendicular to the surface 26 and the chief ray 52, is selected so that the chief ray 58 of the deflected beam 60 has a wavelength equal to the wavelength at the center of each spectral increment or step (corresponding to each angular step of rotation of the motor shaft 14) and this chief ray 58 is always, for each spectral increment regardless of the tilt of the grating 14, along a line which is imaged to a photodetector 62. This line is along a second optical path which is between the face 26 and the photodetector 62. The photodetector defines an image area or may be used with an aperture 64, rectangular image slit discussed above, to define the image area of the spectrophotometer.

The lens 66, preferably an achromat lens 66, is mounted on the top of the board 10 and converges the deflected beam so that it substantially fills the aperture 64, with light from the spectral increment. The rays 68 and 70 along opposite sides of the deflected beam are of wavelengths at opposite ends of the wavelength increment. These rays are converged by the lens 66 which has one focus at the image area and the other, or conjugate, focus at the object slit 34.

Because each increment is small, lateral chromatic aberration may be disregarded in the spectrophotometer design. Longitudinal chromatic aberration may be also be compensated since the path length between the face 26 of the grating and the lens 66 varies as the grating tilts. By selecting the length of the first path between the object slit 34 and the grating 24, longitudinal chromatic aberration may also be compensated. The use of an achromat 66 is preferred, since the achromat is designed to compensate for longitudinal aberration which may be present even with the automatic path length compensation due to the geometry of the beam along the first path from the object slit 34 to the grating 24.

The grating is tilted according to the grating equation $\sin\theta_1+(\lambda m)/p=\sin\theta_2$ in order to scan the spectrum across the image slit 64. For all grating orientations, the incident chief ray and the diffracted chief ray are separated by 45°. For p=0.833 $\mu$m (1200 lp/mm), the angle of incidence $\theta_1$ is 49.6°, for $\lambda$=700 nm to be centered on slit 64, and the angle of diffraction $\theta_2$ is −4.55°. The angle of incidence $\theta_1$ is 37.2° for $\lambda$=390 nm to be centered on slit 64, and angle of diffraction $\theta_2$ is 7.8°. Tilting the grating in 0.399° steps scans the spectrum across the slit 64 in approximately 10 nm steps. Scanning the range $\lambda$=700–390 nm requires a total of 32 steps. Due to the non linearity of the grating equations, there is a small variation in the size of the wavelength steps when scanning the grating in equal angle steps. The RMS error in the wavelength step is 0.24 mm over the range of 700 nm–390 nm. This residual error can be corrected by varying the radius of the traction surface 16 to form a cam and spring loading the motor such that the motor shaft follows the cam surface.

It is desirable to start each measurement at a index or reference position with the arm tilted to one side or the other, preferably the lower wavelength end of the spectrum. It will be appreciated that the location of the grating and the arm 18 is shown for an increment, of both the angular step and the spectral increment or bin, in the middle of the spectrum.

Then a notch 71 in the arm 18 serves as an indexing device to operate either a switch or a photo interrupter which provides a signal to the motor control circuitry when the motor is indexed to its start or home position.

Each wavelength band or increment is imaged at the image area and the photodetector provides an output level corresponding thereto. This output level may be digitized into a multi bit digital byte or number, for example, of 16 bits, which defines the spectral intensity with a resolution of approximately 65,000 levels. This digital number may be created by utilizing the output of the photodetector to control the frequency of an oscillator and to measure the number of counts or cycles or half-cycles of the oscillator's output (repetition rate) in a counter which provides the digitized spectral output for that increment or step.

It may be desirable such as shown in FIG. 10 to utilize three photodetectors 62A, B and C. All photodetector's outputs are used when a control signal sets a group of amplifiers in a sum circuit 74. Then the effective area under observation is maximized. When the control signal only selects the center photodetector 62B, the sample area is minimized. Note that this configuration changes the height of the sample area and does not effect the spectral resolution. The output of the summing circuit is amplified in amplifiers 76 and 78. The amplifier 78 has 3 times the gain of the amplifier 76 to compensate for the use of a photodetector area of ⅓ that of all three areas 62A, B and C together. The outputs from the amplifier are then applied to a signal processor and digitizer to obtain the digital signals corresponding to the spectral. This signal processor processes the analog signals and then digitizes them and provides the output to a computer or other data processor 82.

The illumination at the red or high wavelength end of the band is detected with greater efficiency by silicon photodetectors than the signals at the low or blue end of the band. In addition incandescent lamps have greater spectral intensity in the red than the blue. A wide dynamic range, for example, over 100 times larger at the red end than at the blue end may need to be accommodated in order to cover the actual intensities involved. In order to reduce this dynamic range, the attenuating element 36 comes into play. Then, at increments in the red end of the band, more attenuation is inserted than at the blue end of the band where the attenuation is minimal. This automatically compensates for the differences in intensity at opposite ends of the band and reduces the dynamic range which must be accommodated by the circuitry operative with the photodetector 62.

Another method of normalizing the detected spectral intensity is use a analog to digital converter to sample and digitize the detected electrical signal from the photodetector. The conversion speed of the analog to digital converter is fast enough to digitize the electrical at least 16 times before the motor increments to the next spectral bin. Signals from each spectral bin are sampled multiple times and summed. Wavelengths from 440–410 nm are digitized eight times and summed. Wavelengths from 410–390 nm digitized sixteen times and summed. The number of times each wavelength bin is digitized is stored with the white and black calibration data. Digitizing the lower intensity bins provides two benefits. The first is that it increases the effective signal level of the low intensity bins. Second, the multiple digitizations average out the digitization noise of the analog to digital converter. At lower signal levels the digitization noise has a larger percentage effect on the detected signal than at higher levels.

Figure 7:
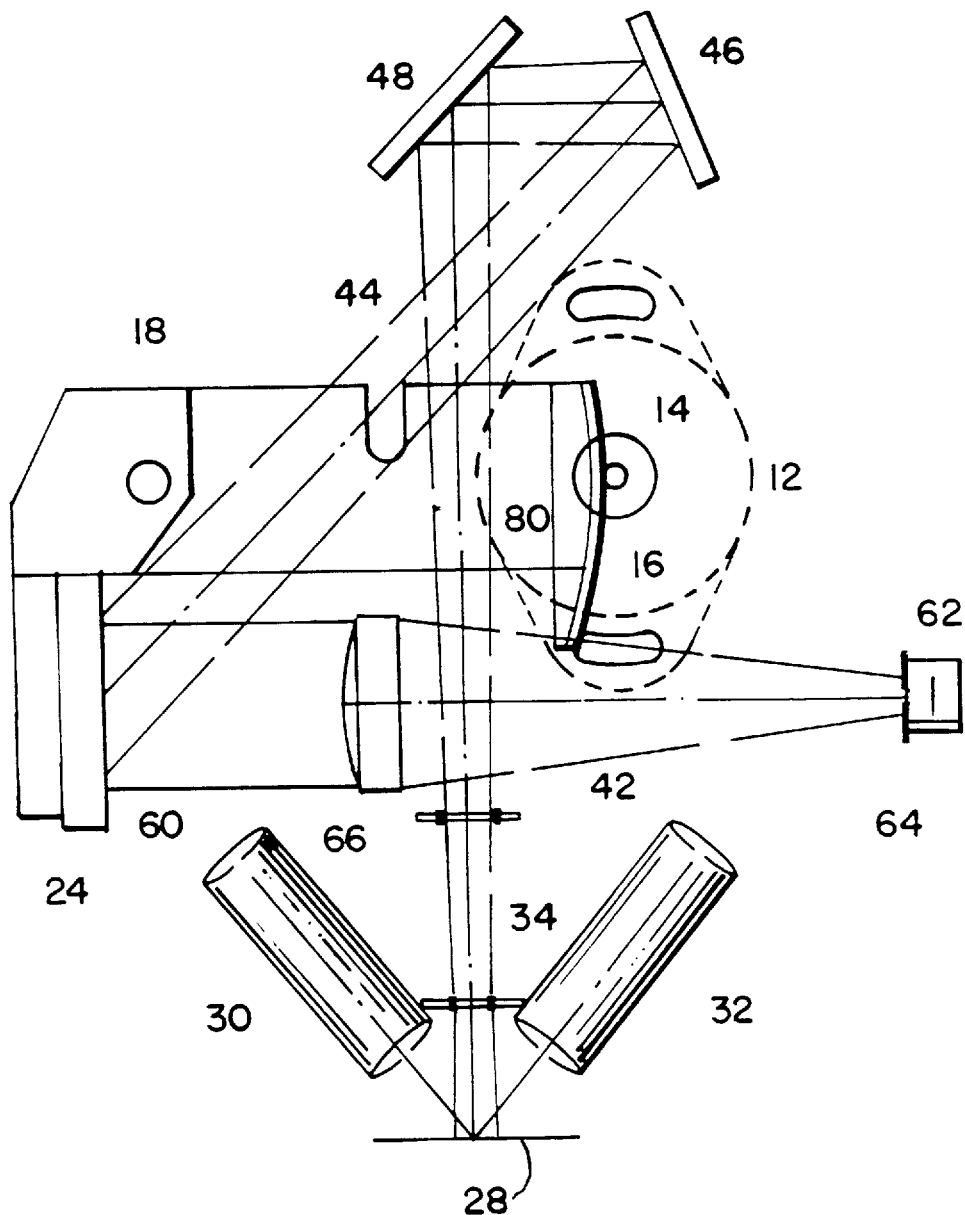
FIG. 7 is a schematic diagram, in the form of a layout, of the components of the spectrophotometer apparatus shown in FIG. 1 in simplified form.

FIG. 7 simplifies FIG. 1 by removing the attenuating element and shows the motor shaft 14 in friction driving contact with the resilient material covered end of the arm 18. This frictional driving relationship is again illustrated at the center of the spectral range. The arm 18 has a lower extension or heel 80 at its resiliently covered end which extends the angle over which the arm 18 and the grating may be tilted.

Figure 8:
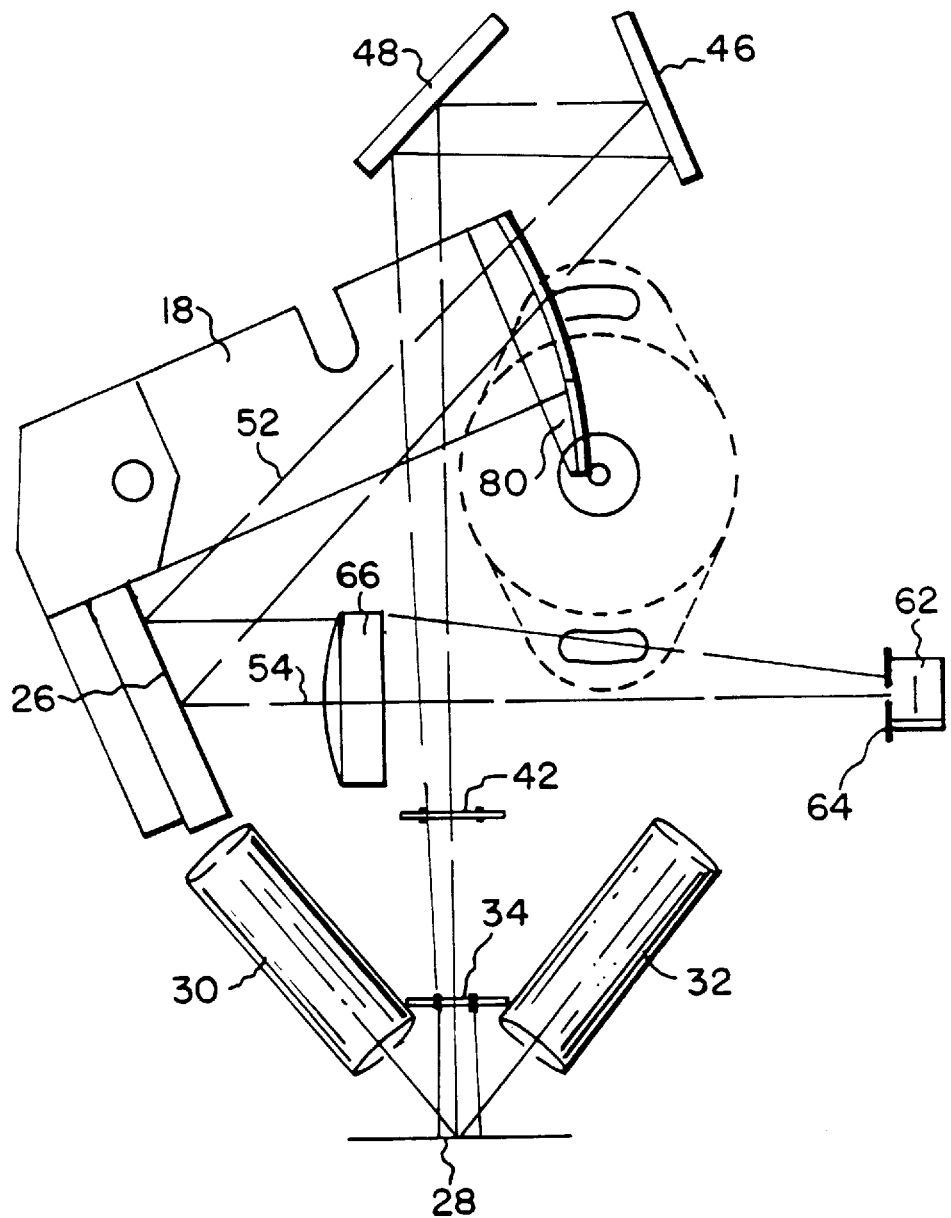
FIG. 8 is a view similar to FIG. 7 but with the dispersive element of the spectrophotometer angularly displaced to a position for specular reflection (zeroth order diffraction) of the light incident thereon.

The arm located at the largest tilt angle of the grating is shown in FIG. 8. This is the angle where the angles of incidence and deflection, both measurable between the center ray and displaced center ray and perpendiculars to the surface 26, are equal. At this position, the grating is operative in its zeroth order mode as a reflector and the beam is specularly reflected and projected through the lens 66 to the photodetector 62. When in the position shown in FIG. 8 the spectrophotometer may be used to measure the intensity of the light at the sample area 28. In this position, the lamps 30 and 32 may be calibrated by using a white body (totally reflective) at the sample area 28. The current which changes the intensity of the lamps 30 and 32 may be stepped through a range over which the lamps are safely operable without burning out or having excessively reduced life. Moreover, each lamp may be separately monitored. The current which illuminates the lamps is then adjusted to provide the calibration, sometimes called the white point calibration. Similarly, a black sample area 28 may be used and the black point intensity calibrated. When the spectrum is measured by stepping the motor through its angular increments and measuring the photodetector output at each step, the photodetector may process the output by subtracting the black point calibration value and ratioing (dividing) the outputs at each spectral increment or bin by the white point calibration value, thereby normalizing the outputs.

The calibration at the specular or zeroth order reflection position shown in FIG. 8 may be also be used to measure the variation in intensity with operating current to each gun which produces each beam and excites the different phosphors, (the red, blue and green phosphors) of a monitor. A calibration curve of the intensity versus gun current may be obtained and used together with the spectral characteristics as measured with this spectrometer over each of the angular increments in order to calibrate the monitor and balance the colors produced by the phosphors.

Figure 9:
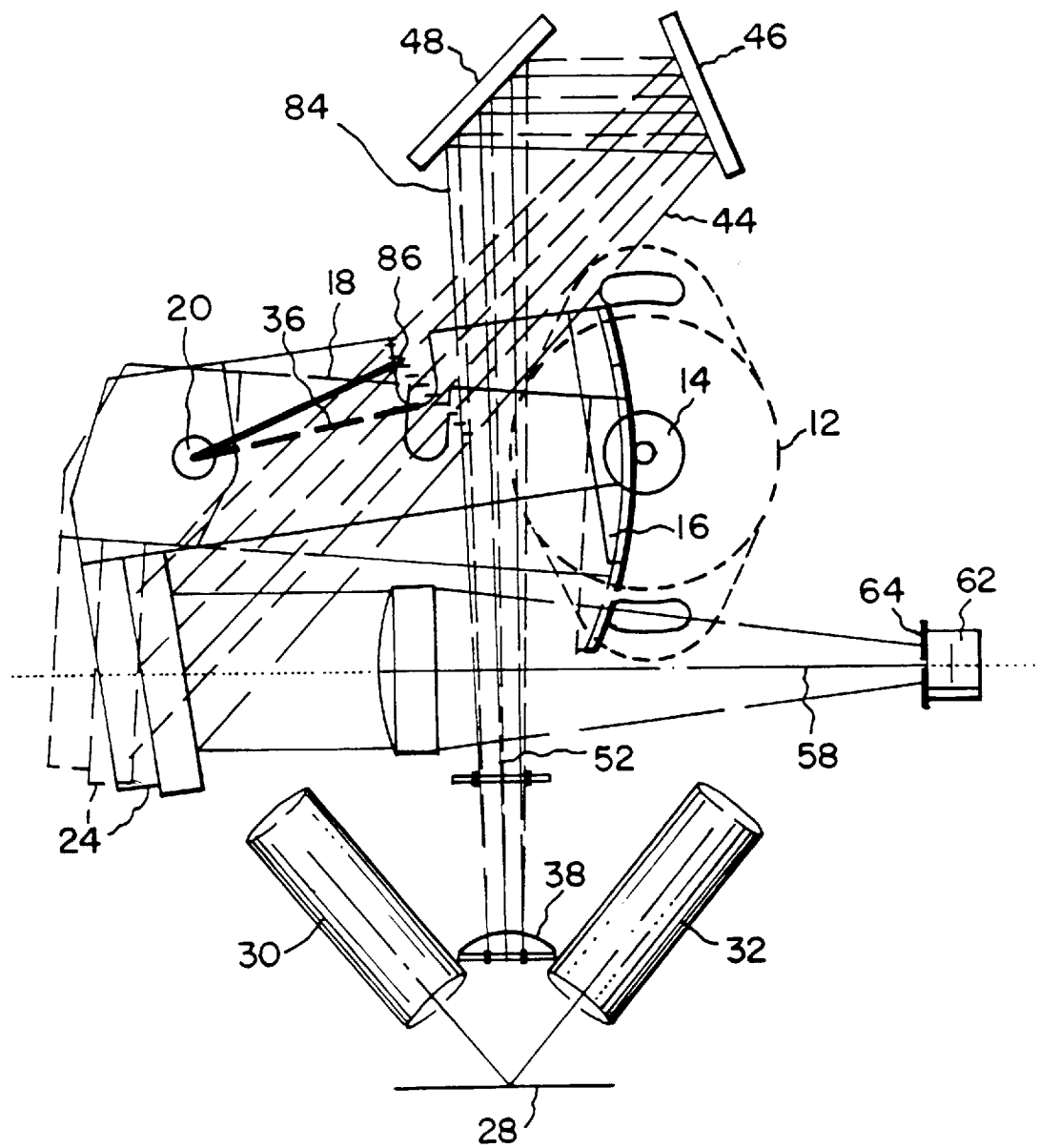
FIG. 9 is a view similar to FIG. 1, but showing the dispersive element and the arm mounting that element and a shutter carried on the arm in two different angular positions where two different wavelength increments of the spectrum of the illumination entering the spectrophotometer, which correspond to these two angular increments or steps, are measured.

FIG. 9 shows a view similar to FIG. 1 with the arm shown in full lines and in dash lines at opposite ends of its angular range, that is when measuring the spectral increments or bins at opposite ends of the spectral range; for example, the bins with central band widths of 390 and 700 nm. It will be noted that the first path or leg 84 of the beam 44 has its central ray 52 perpendicular to the optical axis 58 of the lens 66 irrespective of the tilt of the grating 24. The Fourier transfer plane of the field lens 38 is shown at 86 in FIG. 9.

The self contained hand-held spectrophotometer provided by the invention is also shown within its housing 90 in FIGS. 2, 3, 4, 5 and 6. The housing is made of two shells, namely a bottom shell 92 and a top shell 94, both of plastic, which interlock with each other and capture the spectrophotometer apparatus including the board 10 and the components thereon within the shells, and particularly on posts or stand-offs 96 internally of the shells. These support, as by clamping, the spectrophotometer apparatus at spaced locations on the board 10, and at the support bracket 50 for the mirrors thereby mounting the board and the spectrophotometer optics in fixed position inside the shells. The housing 90 has opposite ends which are a front or object viewing end 130 and a rear end 131.

Figure 4:
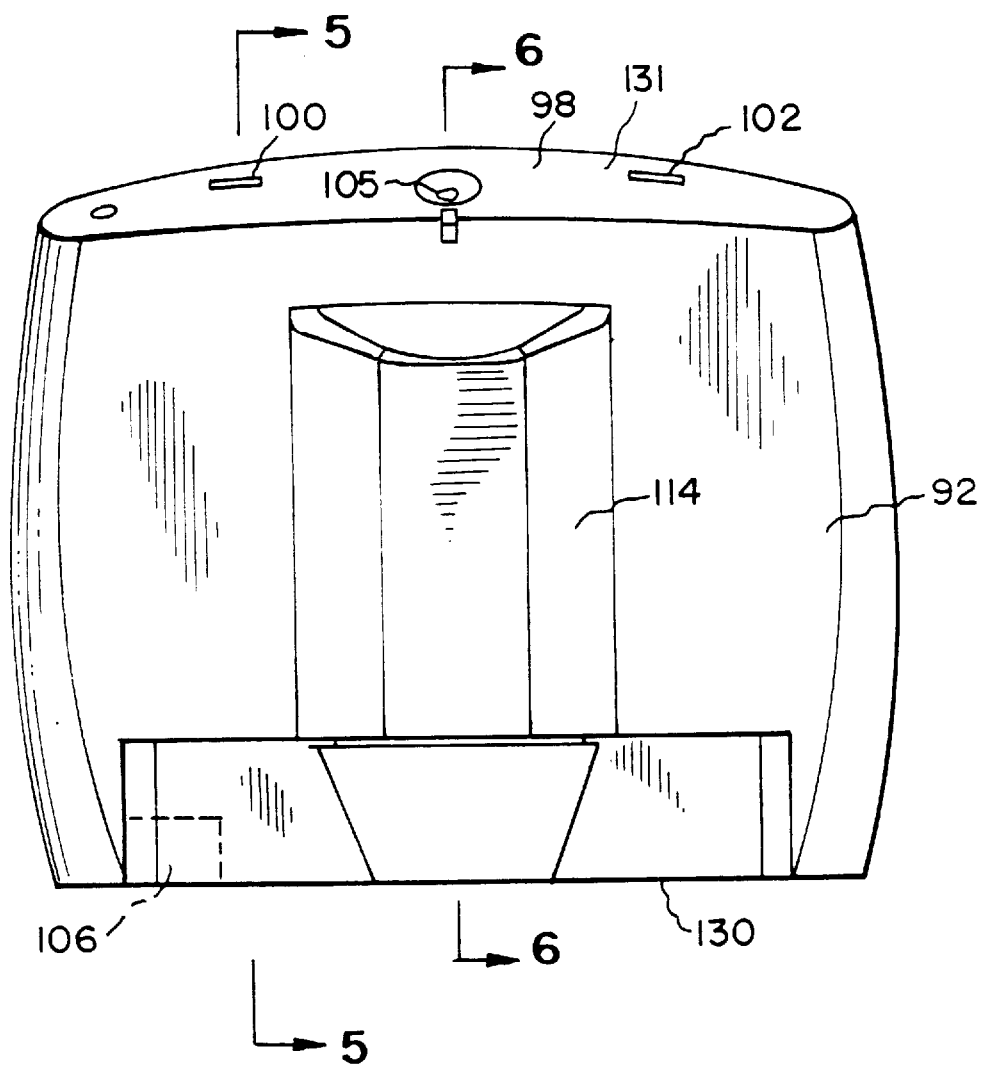
FIG. 4 is a front view of the spectrophotometer shown in FIGS. 2 and 3, the view being taken from the right in FIG. 3.
Figure 5:
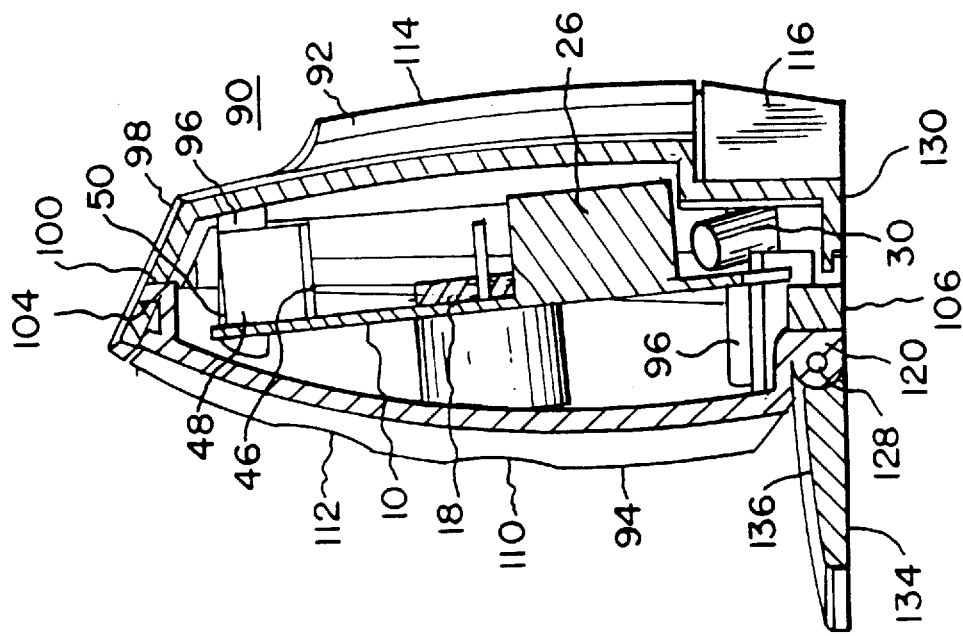
FIG. 5 is a sectional view which is taken along the line 5—15 in FIG. 4, and shows the spectrophotometer apparatus of FIG. 1 contained therein, also as viewed along the line 5—5 in FIG. 1.
Figure 6:
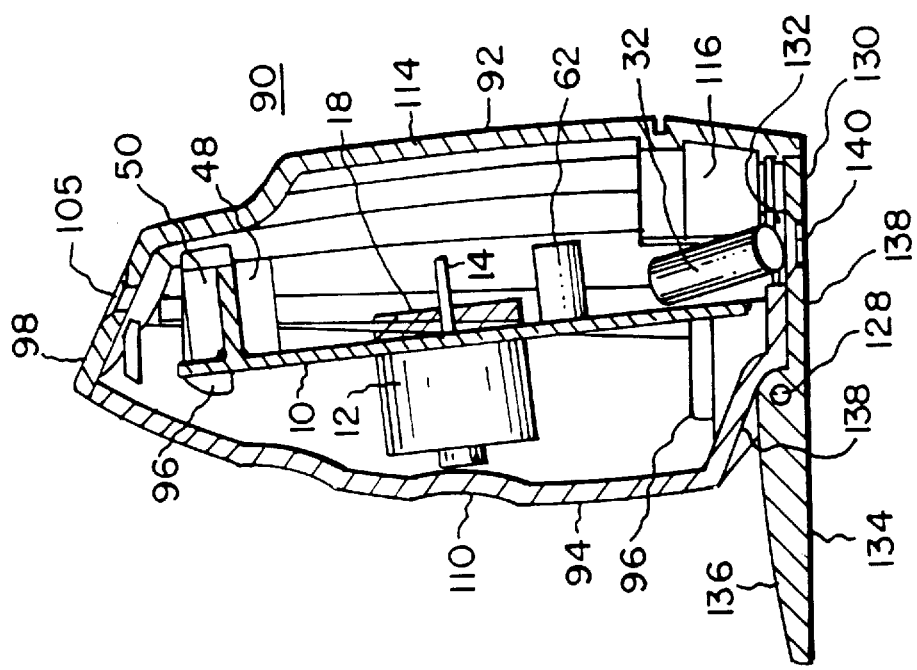
FIG. 6 is a sectional view taken along the line 6—6 in FIG. 4 and also showing the spectrophotometer apparatus of FIG. 1 taken along the line 6—6 in FIG. 1.

The lower housing shell has a heel 98 with slots 100, and 102 which receive tongues, one of which 104 is shown in FIG. 5, all on the rear end 131. Between the slots 100 and 102 there is disposed an opening 105 in which an indicator, for example a light emitting device (LED) may be located which is illuminated when the apparatus is turned on. The circuits on the board 10 also connects to a connector 106 which provides a terminal for the cable (not shown); but discussed above. Only the opening 105 for the LED is shown in FIGS. 4 and 6 to simplify the illustration.

The top of the top shell has indentations 110 and 112 for the fingers of the operator a, while the operators thumb may be placed against a U-shaped section 114 of the bottom shell 92. A switch 116 may be depressed by a flexible section of the U-shaped shoe 114 (a cowling) to energize the spectrophotometer. When the lamps 30 and 32 are to be energized, the switch may be depressed either twice or to a greater extent than when applying power to the other spectrophotometer components.

The shells 90 an 92 are assembled by means of overlapping posts or stanchions 120, 122 on the top shell and 124 and 126 or the bottom shell 92 all at the front on sample viewing end 130 of the housing 90. A rod or pin 128 extends through the overlapping post or stanchions 122, 126 and 120, 124. At the end 130, there is provided an entrance opening 132 for light from the sample. The sample is placed against the sole 134 of a foot plate 136. Preferably, the foot plate is snapped over the rod 128 and therefore is pivotally mounted on the housing so that a section 138 thereof having an entrance opening aperture 140, may be pivoted to bear against the front end 130 of the housing as shown in FIG. 6. Several different foot plates having apertures 140 of different size may be used, including one carrying a fiber optic to an extender which may be placed on a monitor, as with a suction cup.

In operation, the sole of the foot plate is placed against the sample. At this point in time, the foot plate may be tilted clockwise away from the first position shown in FIG. 6 to a second position so that its lower section bears against the inwardly sloping portion 138 of the top shell 94. The entrance opening 140 is then exposed for observation. Then the light from the lamps 30 and 32 may be visible, as a beam projecting through the entrance opening 132 in the housing 90. The spectrophotometer unit can be located or aligned with the sample area which is to be analyzed. Before the measurement is initiated, the foot plate 136 is brought to the position shown in FIG. 6. Then the switch 116 may be depressed to operate the motor, index the grating 24 to its home position, and begin the sequence of successive angular steps to record the spectrum of the illumination from the sample area.

From the foregoing description it will be apparent that there has been provided improvements in the field of spectrophotometry (also known as colorimetry and color spectrometry) and particularly and improved spectrophotometer instrument. Variations of modifications in the methods and apparatus described herein, within the scope of the invention, will undoubtedly suggest themselves to those skilled in the art. Accordingly the foregoing description should be taken as illustrative and not in a limiting sense.

We claim:

1. Spectrophotometer apparatus comprising means for presenting, at an object area having first and second dimensions transverse to each other, a wavelength increment between lower and higher ends thereof, across said first dimension of said object area, photodetector means responsive to light from said object area across both said first and said second dimensions, and means for controlling the extent of the area in said second dimension over which said photodetector means is responsive.

2. The apparatus according to claim 1 where said first dimension is the width of said area and said second dimension is the height of said area.

3. The apparatus according to claim 1 wherein said photodetector means comprises a plurality of photodetectors exposed to said area and respectively providing different ones of a plurality of separate outputs, one of said plurality of photodetectors being disposed at the center of said area and the others of said plurality of photodetectors being spaced along said second dimension on opposite sides of said one photodetector, and said controlling means selectively providing said separate outputs individually and in combination, to provide an output signal from said photodetector means.

\* \* \* \* \*